Patented July 1, 1930

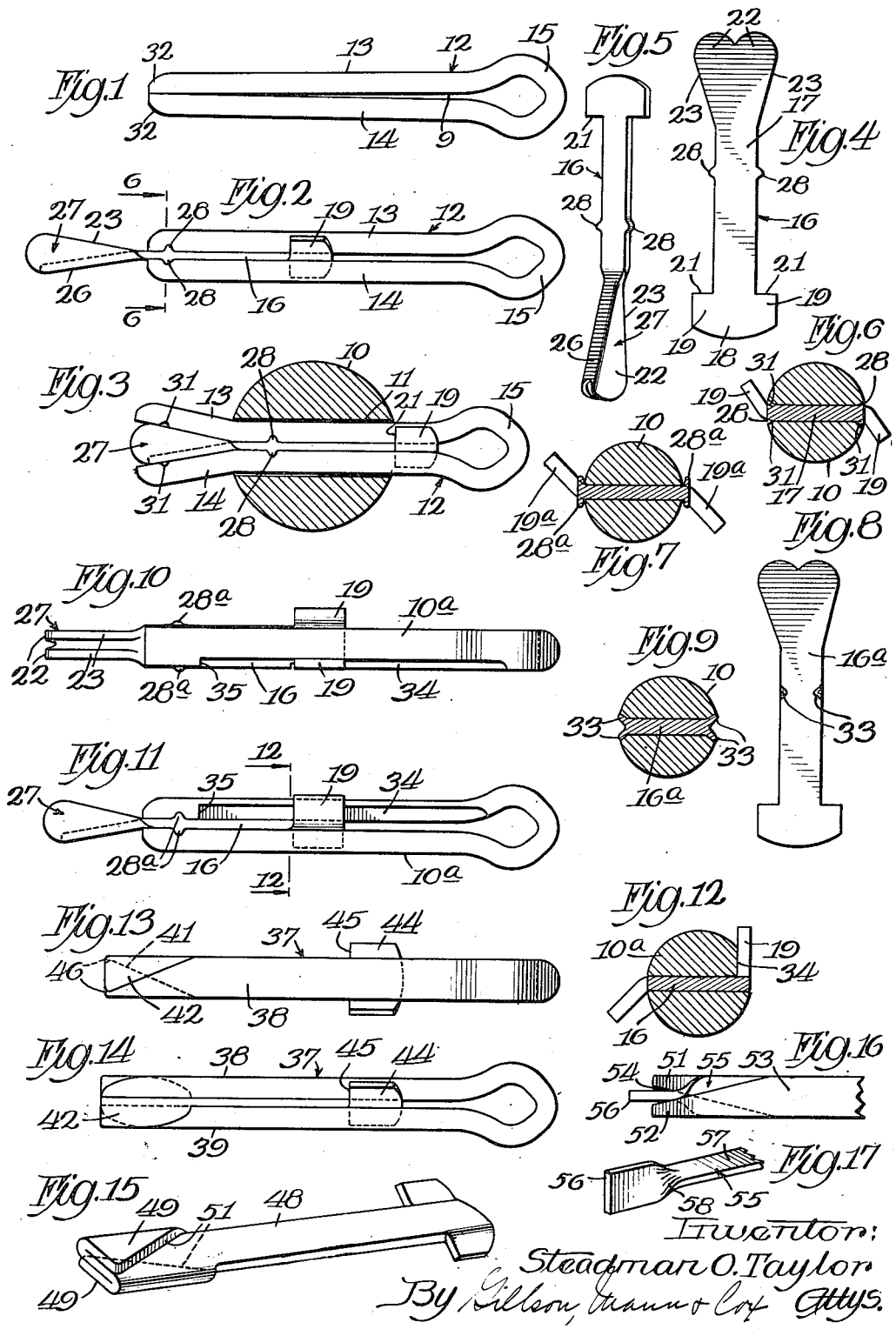

1,768,721

UNITED STATES PATENT OFFICE

STEADMAN O. TAYLOR, OF ST. LOUIS, MISSOURI, ASSIGNOR TO T & S CORPORATION, OF CHICAGO, ILLINOIS, A CORPORATION OF ILLINOIS

FASTENING DEVICE

Application filed May 25, 1928. Serial No. 280,548.

This invention relates to devices for retaining cotter and other pins in position while in use.

One of the objects of the invention is the provision of new and improved means for holding a pin and the means for distorting the outer end of the same, in assembled relation, whereby the parts may be assembled at the factory and shipped to the dealers in condition for use.

Another object of the invention is the provision of new and improved means for positioning and holding cotter and other bifurcated pins and devices, for spreading the outer ends of said pins in assembled relation, whereby relative lateral movement of the parts is prevented and relative longitudinal movement yieldingly resisted.

A further object of the invention is the provision of a new and improved pin and spreader device that is cheap to manufacture, easily assembled, readily applied, efficient in operation, and that is simple and rugged in construction.

Other and further objects and advantages of the invention will appear from the following description taken in connection with the accompanying drawings, in which Fig. 1 is a plan view of a cotter pin;

Fig. 2 is a plan view of a cotter pin and spreader member in assembled relation;

Fig. 3 is a transverse section of a bolt showing the cotter pin and spreader member in operative position in an opening in said bolt;

Fig. 4 is a plan view of a blank from which the spreader member is made;

Fig. 5 is a perspective view of the spreader member;

Fig. 6 is a section on line 6—6 of Fig. 2;

Fig. 7 is a similar section showing a slightly modified form of retaining lug;

Fig. 8 is a plan view of a blank of a modified form of spreader member;

Fig. 9 is a view similar to Fig. 6 through a cotter pin and the modified form of spreader device shown in Fig. 8;

Fig. 10 is a side elevation of a modified form of cotter pin;

Fig. 11 is a plan view thereof;

Fig. 12 is a section on line 12—12 of Fig. 11;

Fig. 13 is a side elevation of a modified form of cotter and spreader device, showing the same in assembled relation;

Fig. 14 is a plan view thereof;

Fig. 15 is a perspective of a modified form of spreader to be used in connection with the pins shown in Figs. 13 and 14;

Fig. 16 is a view similar to Fig. 13, but showing a modified form of construction; and Fig. 17 is a perspective view of the outer end of the spreader member shown in Fig. 15.

Referring now to the drawings, the reference character 10 designates a bolt, pin or other element which is provided with a hole 11 for receiving a cotter or other bifurcated pin 12.

For the purpose of illustrating the invention, which is by way of example only, the pin 12 is in the form of a cotter pin comprising the two arms 13 and 14 and the connecting portion 15. The arms of the pin are in contact at their outer ends and are spaced apart as at 9 at their inner portions so that they will be substantially parallel and will clamp the spreader member throughout its length, when the same is in position, as will presently appear.

The pins may be formed from wire or rods half round, round or angular in cross section, as is usual in such constructions.

Suitable means are provided for automatically distorting the outer ends of the pin 12 upon the insertion of the same through the opening 11. Any appropriate means may be employed for this purpose. In a form of the device selected to illustrate an embodiment of the invention, a spreader member 16 formed from sheet metal is employed for this purpose. The spreader member 16 is stamped from sheet metal to form the blank shown in Fig. 4 which comprises a body portion 17, a head 18 having one or more laterally extending projections 19 forming shoulders 21, and the wings 22 having the inclined edges 23 respectively.

The wings 22 are adapted to be folded into substantial parallelism as shown in Figs. 2 and 5, and the connecting portion is flattened as shown at 26 in Fig. 5 to form a wedge portion 27.

The wedge portion 27 is bent slightly in the direction of the connecting portion so that it will be symmetrical with respect to the body portion 17, the flattened face 26 constituting one wedging surface and the inclined edges 23 the other.

In using the spreader member 16 it is placed between the arms of the pin and the pin is inserted in the opening 11. The shoulders 21 will engage the bolt 10 and hold the spreader member, and upon forcing the pin 12 through the opening 11 as by a blow or blows from a hammer, the wedge portion 27 will distort the ends of the arms as by spreading the same.

The arrangement thus far described is substantially the same as that disclosed in the application of Helmer Dedering, Ser. No. 241,583, filed December 21, 1927, on which this invention is an improvement.

It is desirable that means be provided to properly position the spreader member and to retain the parts in assembled relation when the device is not in use, as during shipment from the factory and subsequent handling preparatory to placing the same in use.

By making the pin so that when the spreader member is in position the arms 13 and 14 will be parallel, the clamping action of the arms will be distributed over the entire length of the head and body portion of said clamping member for holding the same. This is an important feature in retaining the parts in assembled relation, but is not sufficient to position the parts or for preventing their separation, under rough handling. The inner end of the device may be prevented from moving laterally by bending the projections 19 more or less as shown in Fig. 6.

In order to prevent the outer end of the spreader member from moving laterally, the blank from which the spreader member is formed may be provided at each side with one or more projections 28, see Figs. 4 and 5, which are upset after the member has been assembled in the pin whereby the upset portion will be caused to indent the edges of the cotter arms as at 31, thereby preventing accidental movement of the spreader member both laterally and longitudinally. The projections 28 are readily disengaged from the indentations but the interlocking connection is sufficient to prevent accidental disengagement of the parts during shipment and handling of the pins.

If desired, the outer corners of the ends of the arms 13 and 14 may be beveled or curved as shown at 32 to facilitate the entrance of the pin in the opening 11.

After the pin and spreader have been assembled as in Fig. 2, the pin is secured in position by inserting it in the opening 11 in the bolt 10 until the shoulders 21 come into contact with the bolt, after which one or more blows with the hammer will drive the pin through the hole and at the same time cause the distortion of the ends of the pin as by spreading the same, as clearly shown in Fig. 3, whereby the pin will be permanently held in the opening 11.

The form of the device shown in Fig. 7 differs from that just described in that the projections 28 of the spreader member 16 are upset just sufficient to form flanges or stops 28$^a$ for engaging the sides of the pin 10 to prevent lateral movement of said member. In this form, the clamping action of the arms of the pin is relied on to prevent loss of the spreader member due to its accidental longitudinal movement in said pin.

In Figs. 8 and 9 is shown a modified form of spreader member. In this form of construction instead of providing tabs or projections on the side edges of the spreader member 16$^a$ and upsetting the same as in the forms described above, the side edges are distorted by a punch to provide raised portions 33. These raised portions may be formed before or after the spreader member has been inserted between the arms of the pin 10. When they are formed before the spreader member is inserted between the arms of the pin, the pin is given one or more blows opposite these raised portions, after the spreader is in position in the pin, which will cause said raised portions to indent the arms thereby becoming temporarily interlocked therewith. When the raised portions are formed after the spreader member is in position in the pin, the raised portions will be caused to indent the arms while they are being formed.

In Figs. 10, 11 and 12 the spreader member 16 is prevented from being disengaged from the pin 10$^a$ by removing a portion of one of the arms as shown at 34, forming a shoulder 35. One of the lateral projections 19 is bent at substantially right angles to the member 16 for engaging the shoulder 35 for limiting the outward movement of the spreader member. The upset portions 28$^a$ which are the same as that shown in Fig. 7 will prevent lateral movement of the spreader member and will position the same in the pin 10$^a$.

In Figs. 13 and 14 is shown a modified form of pin and spreader member. In this form of construction the ends of the arms of the cotter or bifurcated pin 37 are bent laterally at substantially right angles to the plane of the arms when they are distorted. The cotter pin 37 has one of its arms 38 cut diagonally in one direction and the other arm 39 cut diagonally in the other direction for forming a V-shaped recess 41 for receiving the wedge-shaped head 42 of a spreader member 43. The spreader member 43 may be forged or cast and has lateral extensions 44 at its inner end which are provided with shoulders 45 for engaging the bolt or other member for limiting the movement of the spreader member when the pin is inserted in holding position, as in the previously described devices.

In this form of construction, the projections 44 are bent to prevent lateral movement of the inner end of the spreader member, as previously described. The inclined ends of the arms will prevent lateral movement of the outer end of the spreader member. The points 46 of the arms of the pin are bent over the outer end of the wedge shaped head 42, thereby temporarily preventing longitudinal movement of said spreader member outwardly.

In Fig. 15 is shown a spreader member 48 made from sheet metal that is adapted to be used with the type of pin shown in Figs. 13 and 14. The wedge shaped head is formed by providing wings or projections 49 having oppositely inclined edges 51 and bending these wings back on the body portion of the spreader member, as clearly shown in Fig. 15.

In Figs. 16 and 17 is shown a modified form of construction from that disclosed in Figs. 13 and 14. In this form of the device the outer ends of the arms 51 and 52 of the pin 53 are diagonally cut to form a V-shaped recess 54 as in the construction shown in Fig. 13. The spreader member 55 has its outer end 56 twisted at right angles to the body portion 57 for engaging the V-shaped recess 54. In order to retain the spreader member in position between the arms of the pin, the outer ends of the arms are bent toward each other as shown in Fig. 15 for engaging the shoulders 58 formed by the twist in the spreader member.

While the spreader member is shown as being used in connection with a cotter pin, it is understood it may be used in connection with other types of pins having bipartite ends.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In combination, a pin having a bifurcated end, means for automatically distorting said end during the insertion of said pin to its operative position in an opening, and means for yieldingly resisting disengagement of said first-named means from said pin longitudinally thereof and for positively preventing lateral movement of said first-named means relative to said pin.

2. In combination, a pin having a pair of arms, a spreader member between said arms, interlocking means between said pin and member for preventing accidental disengagement of said member from said pin longitudinally thereof.

3. In combination, a pin having a pair of arms normally in contact at their outer ends and spaced apart at their inner ends, a spreader device between said arms and clamped thereby, and means at a plurality of points along said spreader at each side thereof for engaging said arms, for preventing lateral movement of said device relatively to said arms.

4. In combination, a pin comprising a pair of arms normally in contact at their outer ends and spaced apart at their inner ends, a sheet metal spreader member between said arms and clamped thereby throughout the length of said member, said member having lateral extensions bent for engaging said pin to prevent lateral movement of the inner end of said member, and flanges on an intermediate portion of said member at each side thereof for engaging the side edges of said arms for preventing accidental lateral displacement of the forward end of said member.

5. In combination, a pin having a pair of arms provided with a connecting portion at their inner ends, a spreader member between said arms for automatically distorting the outer ends of said arms during the insertion of said pin in an opening, and means at a plurality of points at opposite sides of said pin for positioning said member between said arms.

6. In combination, a pin having a pair of arms, a connecting portion between the inner ends of said arms, a spreader member between said arms for automatically distorting the inner ends of said arms during the insertion of said pin in an opening, and means for yieldingly resisting relative longitudinal movement of said member, said arms being normally in contact only at their outer ends, whereby when said spreader member is in position in said pin, said arms will be substantially parallel and will clamp said member throughout its length.

7. In combination, a cotter pin having two arms and a connecting portion, the outer ends of said arms being tapered to facilitate the entry of said pin into an opening, said arms being in contact only at their outer ends, a spreader member between said arms, said member having a shoulder at its inner end and having a wedge shaped portion at its outer end whereby when said pin is inserted in an opening in an element said shoulder will engage said element and cause said wedge shaped portion to distort the outer ends of said pin, and an interlocking connection between said pin and said member spaced from said shoulder to position and yieldingly retain said member between said arms.

8. In combination, a cotter pin comprising a length of wire bent back on itself to form a pair of arms connected at their inner ends by a loop portion, a spreader member between said arms, said spreader member comprising a strip of sheet metal having a shoulder at one end and having wings at its other end provided with inclined edges, said wings being bent to form a wedge member, and means on said spreader member engaging said arms at each side thereof for holding said spreader member between said arms with its longitudinal axis parallel with the longitudinal axes of said arms.

9. In combination, a cotter pin having two arms connected at their iner ends by a loop portion, the outer ends of said arms being beveled to facilitate the entrance of said pin into an opening, a spreader member between said arms, said spreader member comprising a strip of sheet metal having a shoulder at one end and having wings at its other end provided with inclined edges, said wings being bent to form a wedge member, and means at the inner end of said member and at a point between the ends thereof for engaging the sides of said arms for preventing lateral or angular movement of said spreader member relative to said arms.

In testimony whereof I affix my signature.

STEADMAN O. TAYLOR.